United States Patent [19]
Sherfield

[11] Patent Number: 6,082,044
[45] Date of Patent: *Jul. 4, 2000

[54] HYDROPONIC CULTIVATION APPARATUS AND METHOD

[76] Inventor: Charles O. Sherfield, 815 W. Marshall, Phoenix, Ariz. 85013

[ * ] Notice: This patent is subject to a terminal disclaimer.

[21] Appl. No.: 08/770,825

[22] Filed: Dec. 20, 1996

Related U.S. Application Data

[63] Continuation of application No. 08/426,625, Apr. 20, 1995, Pat. No. 5,588,256, which is a continuation-in-part of application No. 07/625,078, Dec. 10, 1990, Pat. No. 5,224,291.

[51] Int. Cl.$^7$ .................................................. A01G 31/00
[52] U.S. Cl. ........................................................ 47/62; 47/56
[58] Field of Search .................................... 47/62, 56, 73, 47/74, 65.5, 59

[56] References Cited

U.S. PATENT DOCUMENTS

| | | | |
|---|---|---|---|
| 2,039,442 | 5/1936 | Mulford | 47/65.5 |
| 3,362,106 | 1/1968 | Goldring | 47/56 |
| 3,733,745 | 5/1973 | Ingerstedt et al. | 47/56 |
| 5,421,123 | 6/1995 | Sakate et al. | 47/56 |

*Primary Examiner*—Michael J. Carone
*Assistant Examiner*—Joanne C. Downs
*Attorney, Agent, or Firm*—Parsons & Goltry; Robert A. Parsons; Michael W. Goltry

[57] ABSTRACT

An apparatus which includes a growing container in which plants are hydroponically grown on a support medium is disclosed. The growing container includes a plurality of openings in which seals are installed. The seals include holes through which the plants grow. When seeds are planted, a hollow tube is placed through the seal hole to maintain the seed in position. After the seed germinates, it grows through the tube. As continued growth expands the plant's stem to the size of the tube, the tube breaks apart and does not constrain future plant growth. Moreover, as the plant grows further, the seal hole expands to accommodate the plant stem. The seal surrounds and contacts the plant stem to reduce evaporation of nutrient solution from the growing container and to keep insects and contamination out of the growing container. A holding container is positioned above the growing container and coupled to the growing container through a manifold arrangement. The holding container may be quickly filled with a single, measured nutrient solution charge for the growing container. Then, a valve is opened, and the manifold arrangement slowly distributes the nutrient solution to the growing container where it is substantially absorbed by the support medium and wicked to the vicinity of the plant within the growing container.

3 Claims, 10 Drawing Sheets

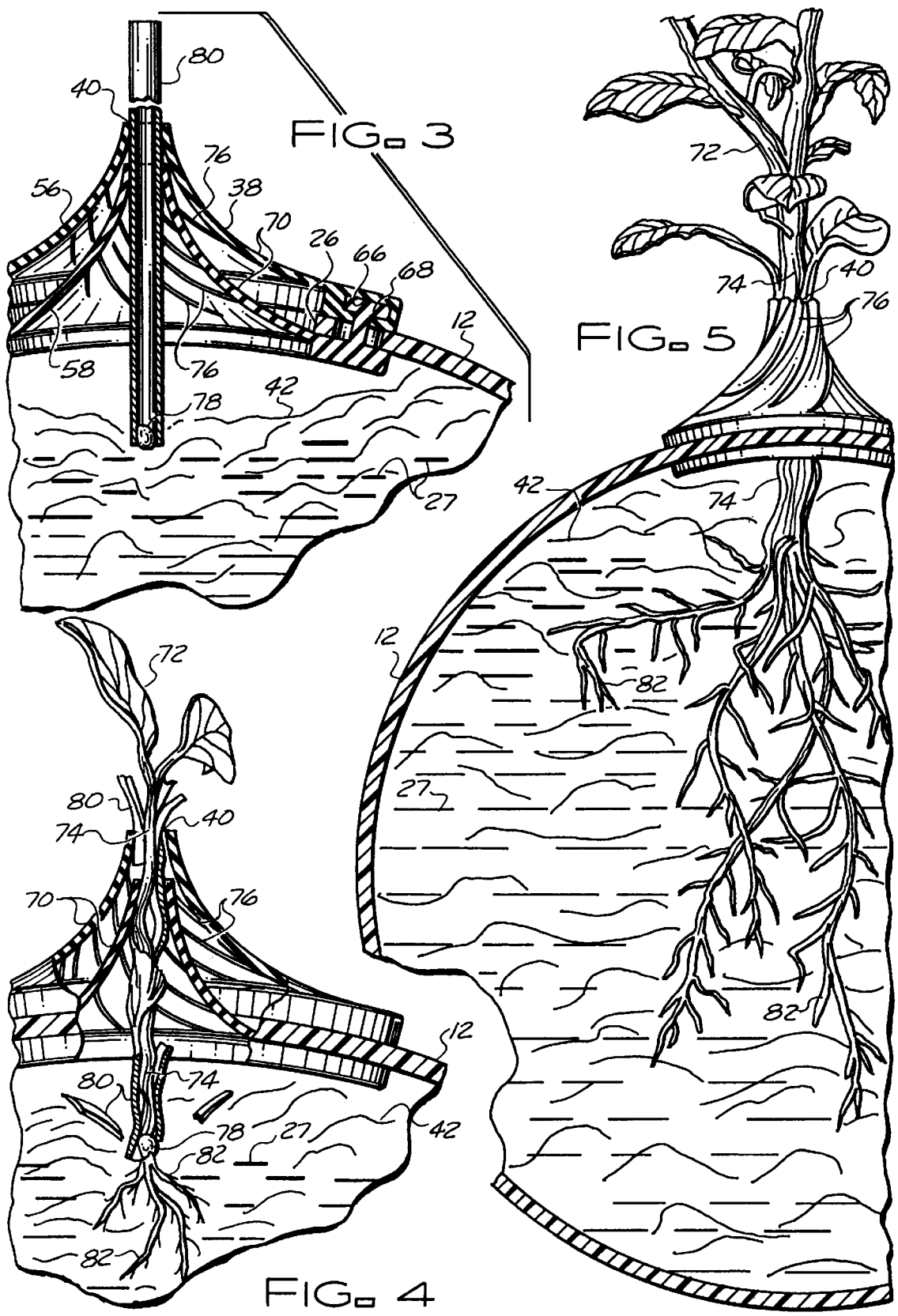

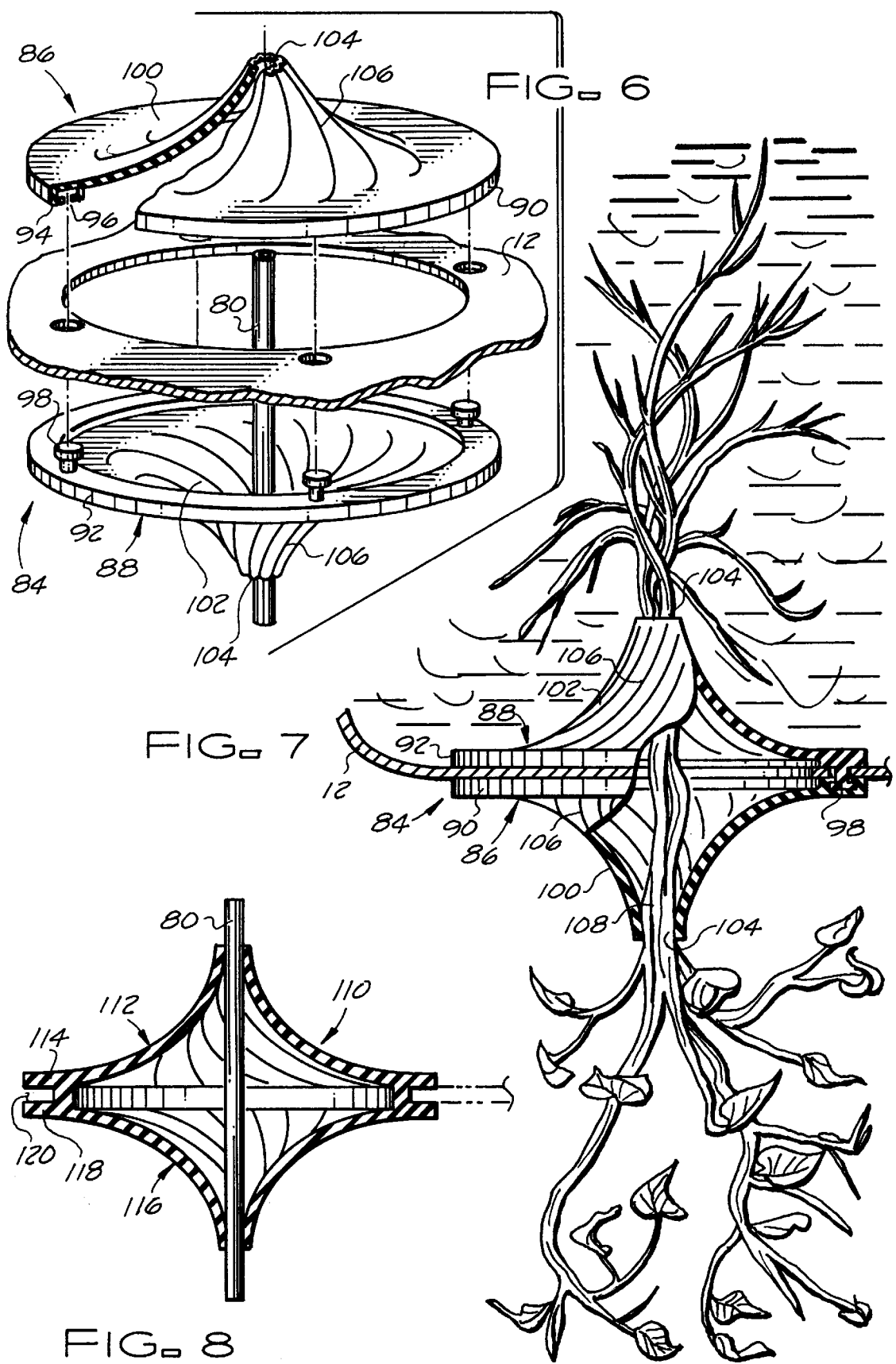

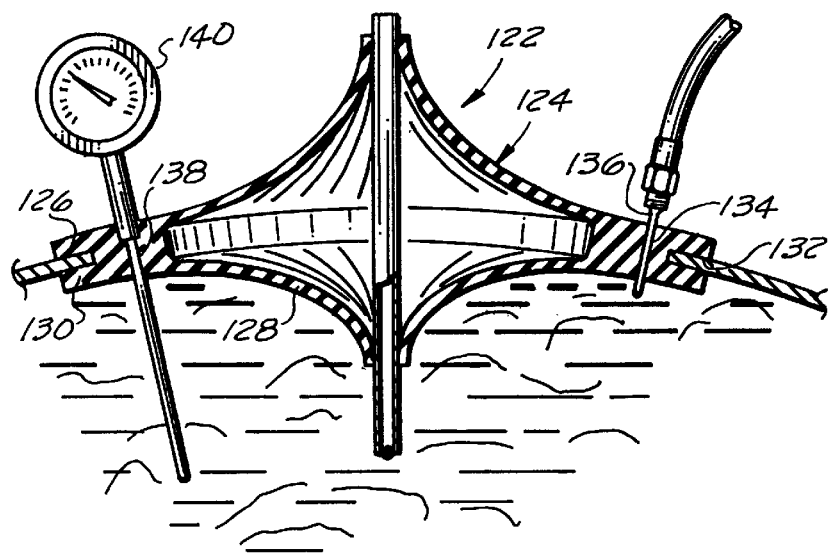
FIG. 9
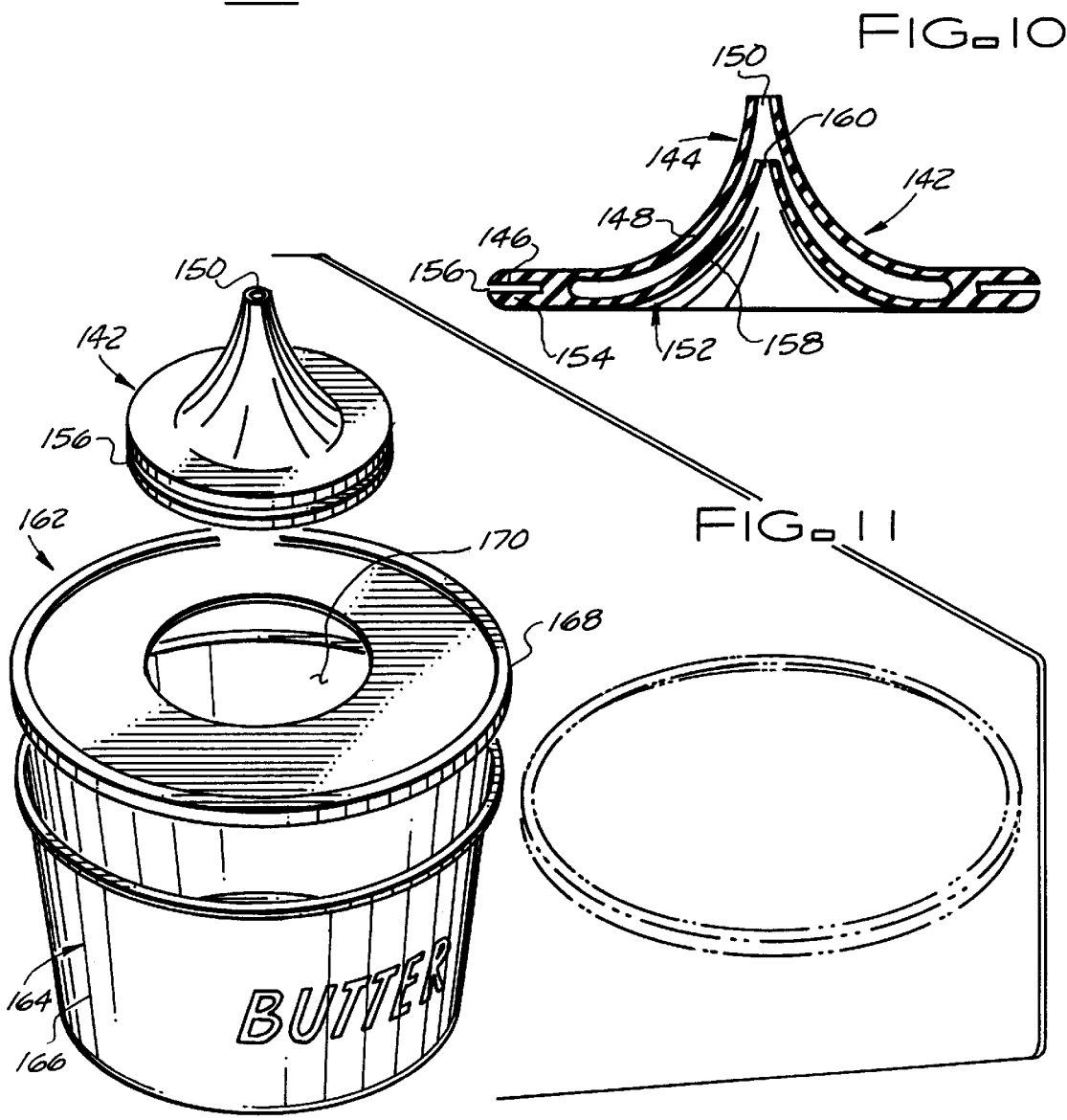
FIG. 10
FIG. 11

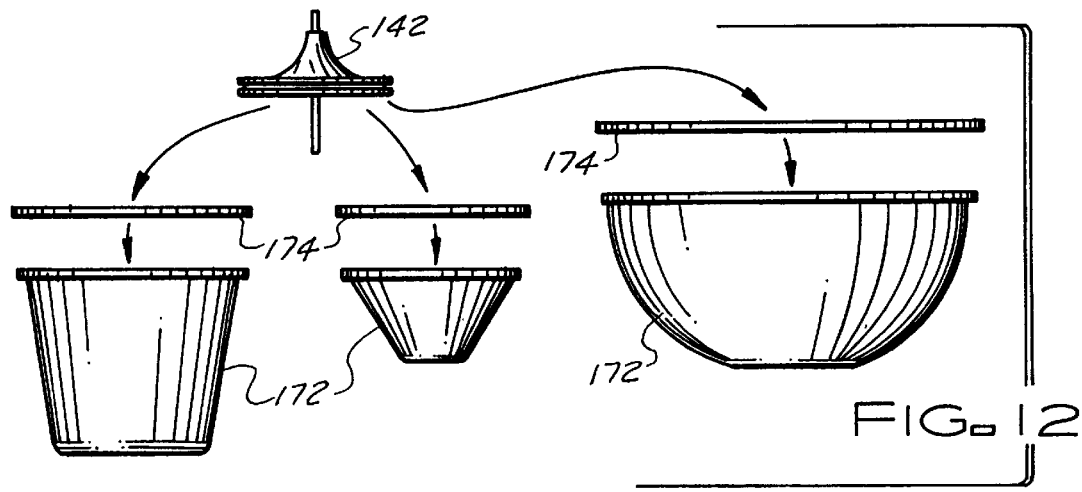
FIG. 12
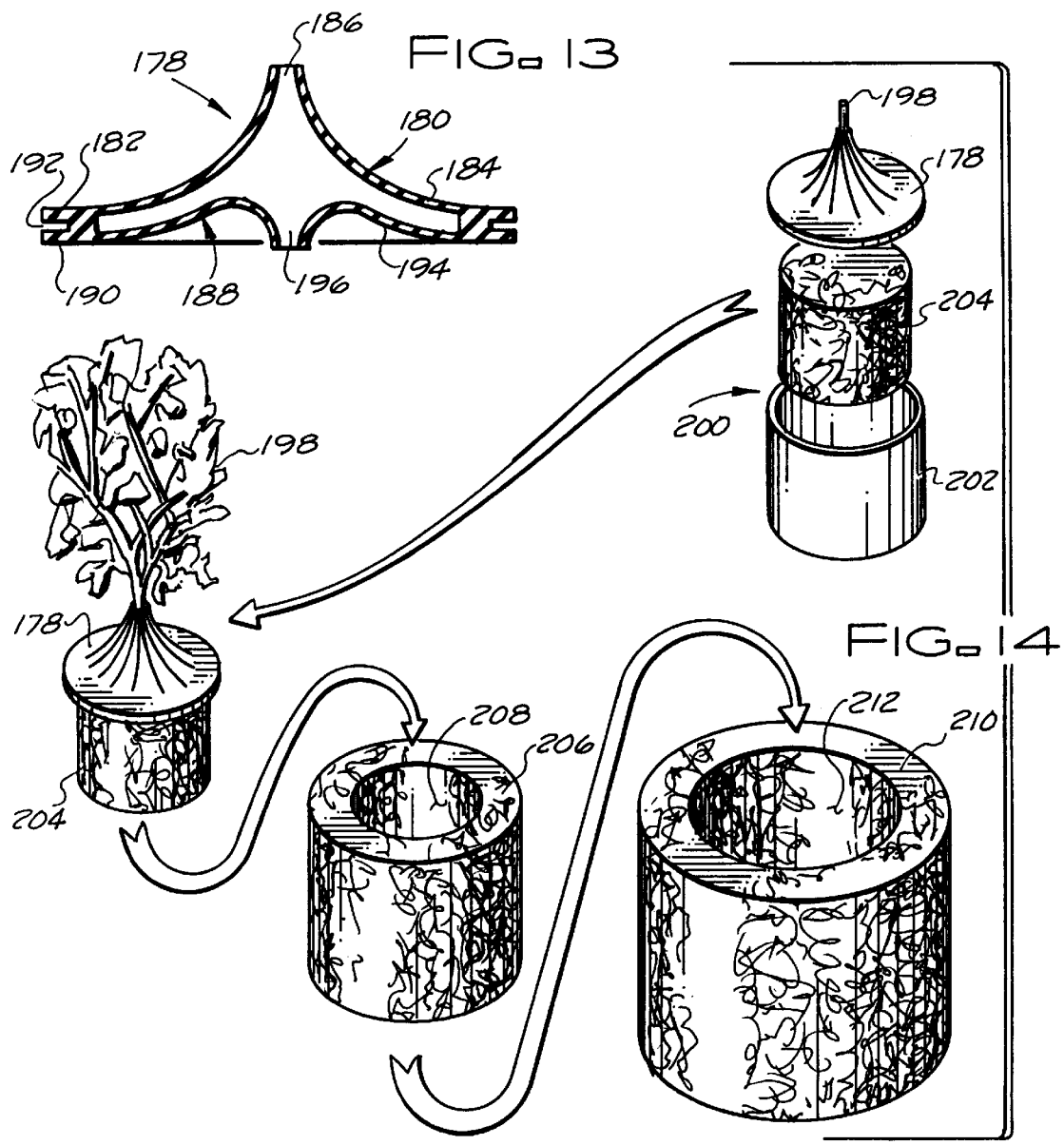
FIG. 13
FIG. 14

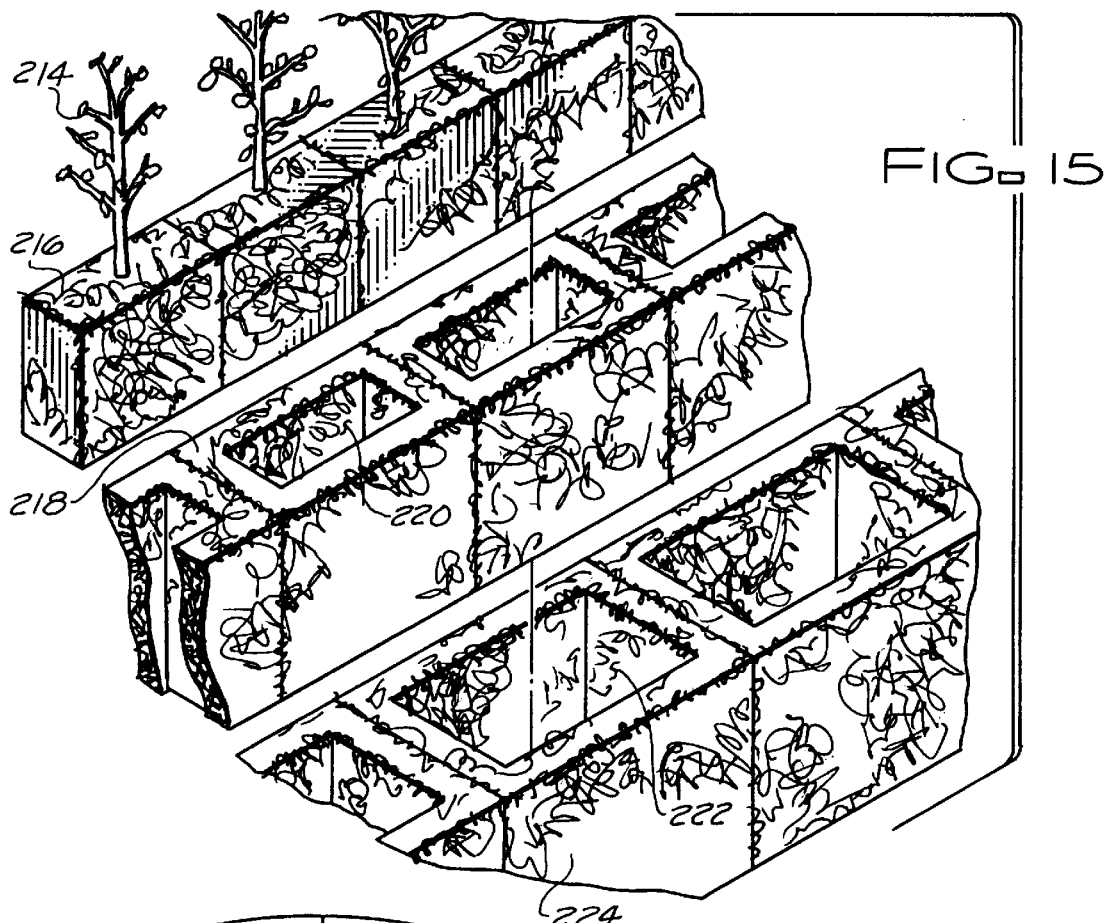
FIG. 15
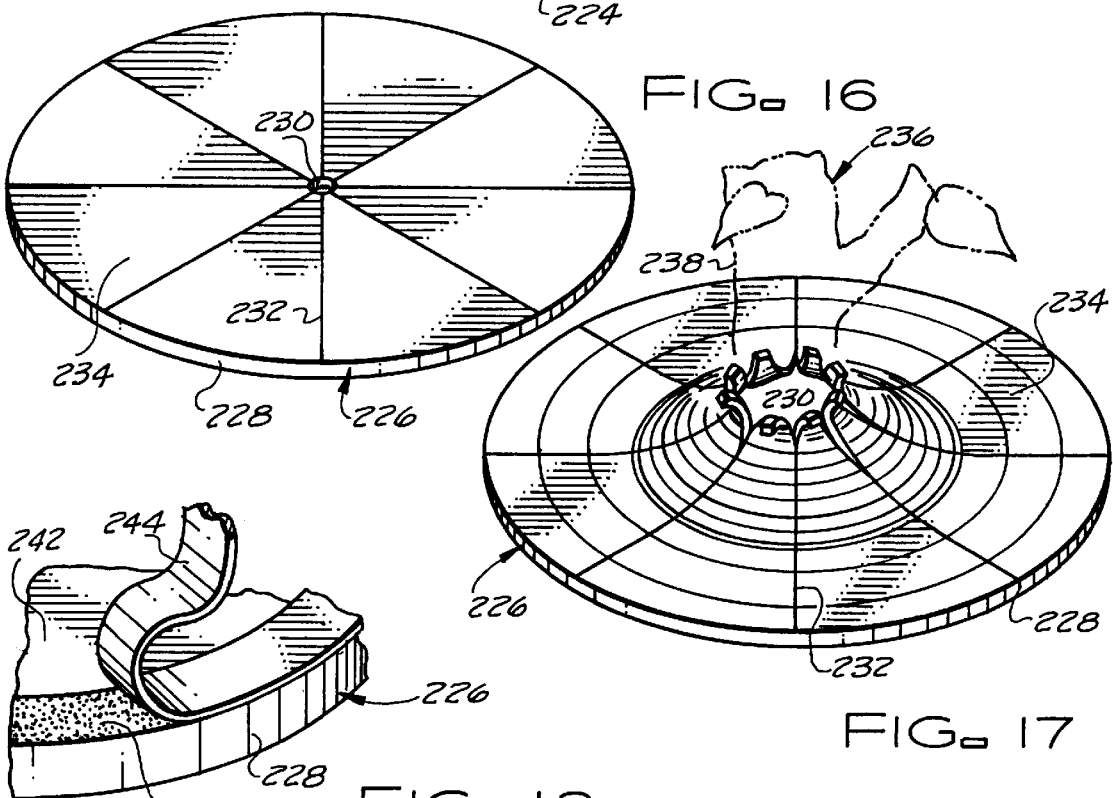
FIG. 16
FIG. 17
FIG. 18

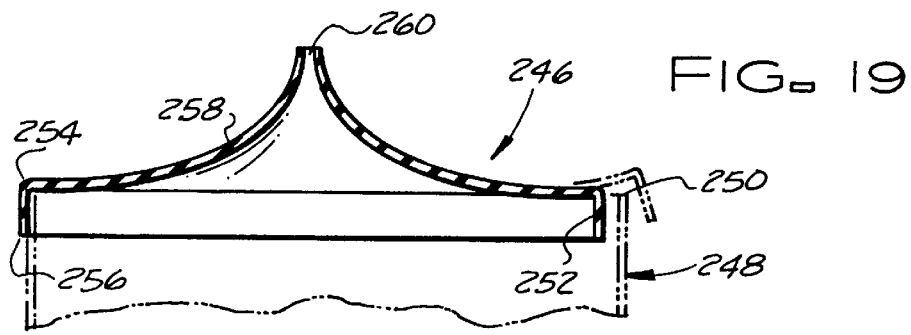
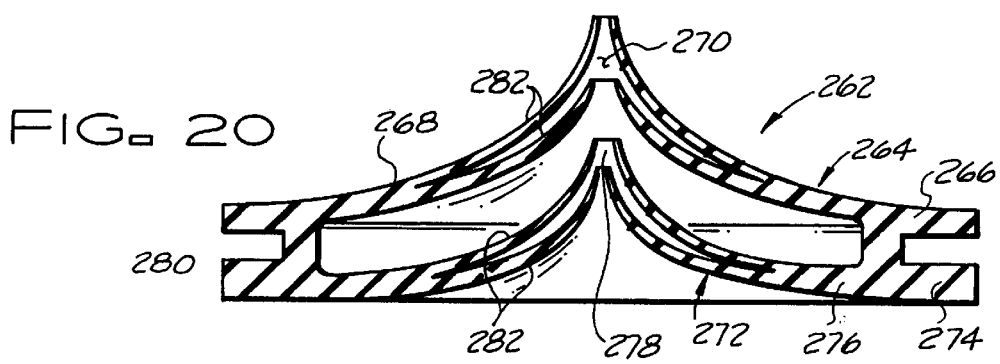
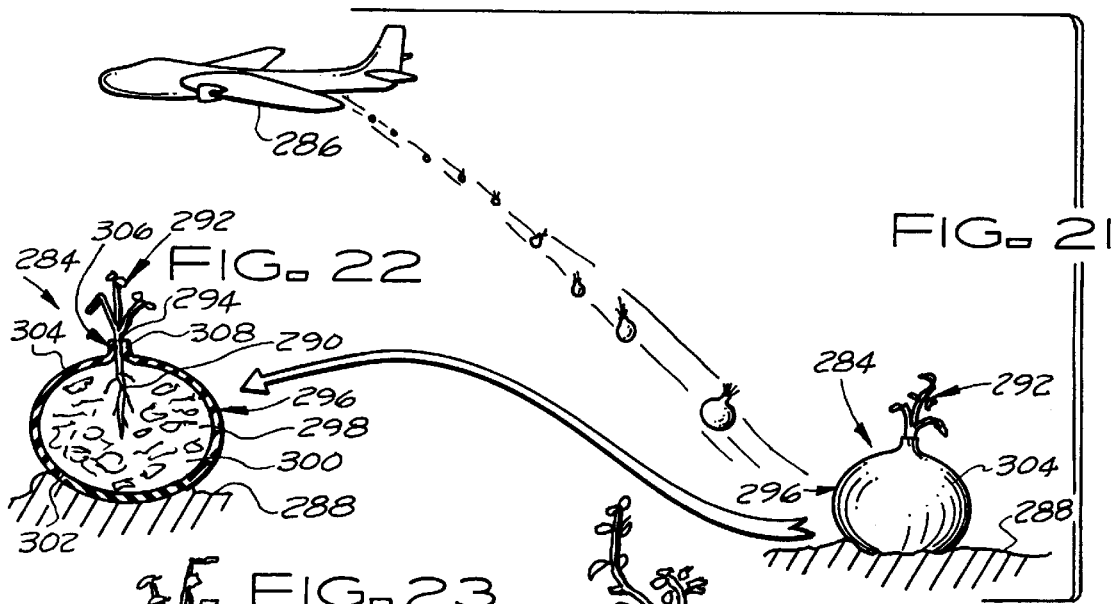
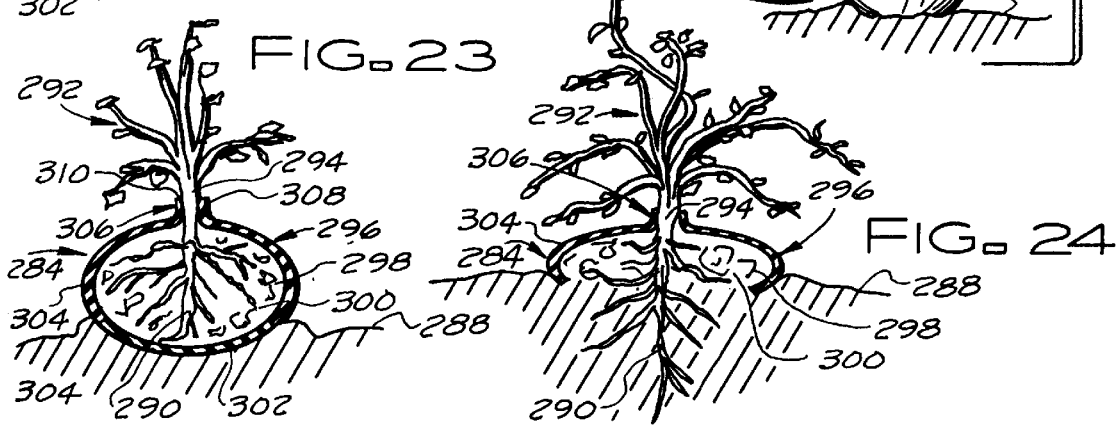

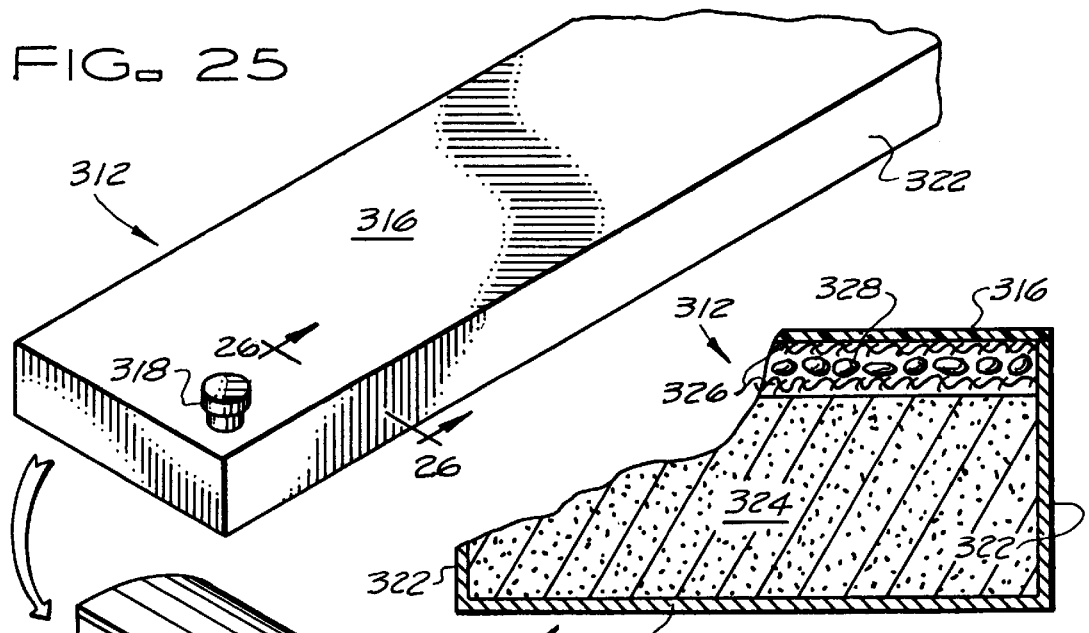
FIG. 25
FIG. 26
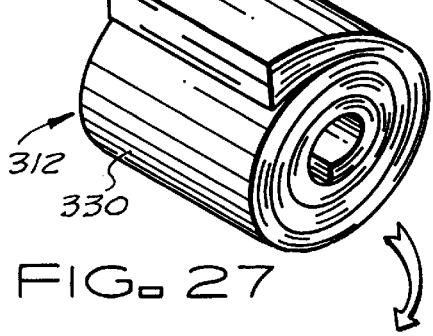
FIG. 27
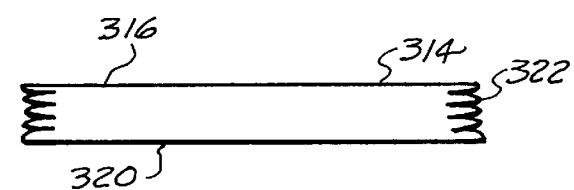
FIG. 28
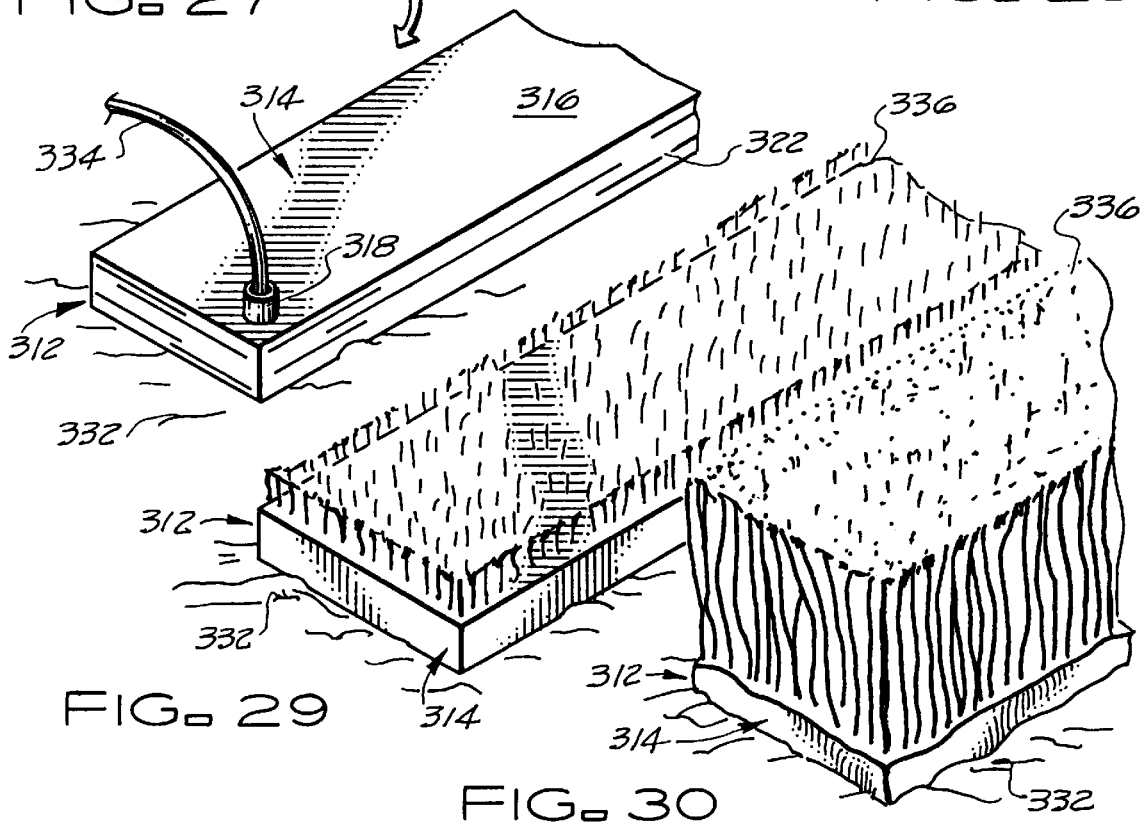
FIG. 29
FIG. 30

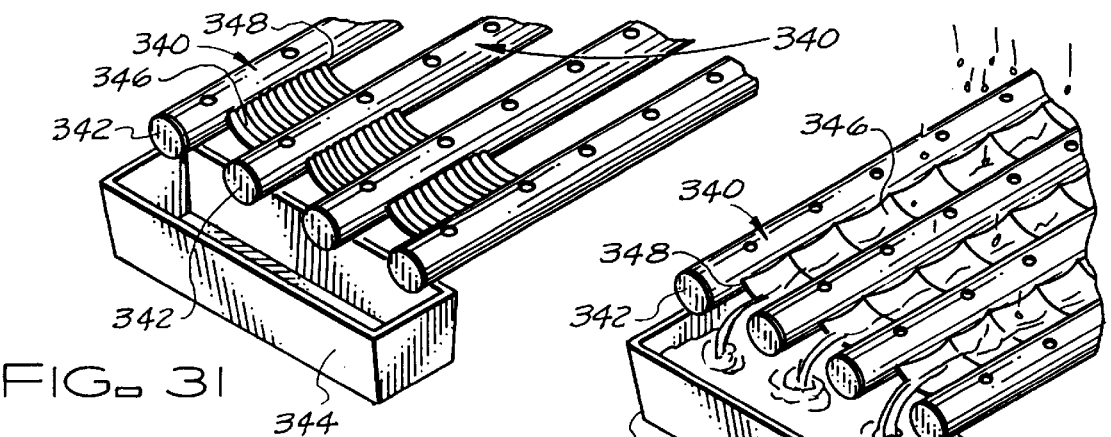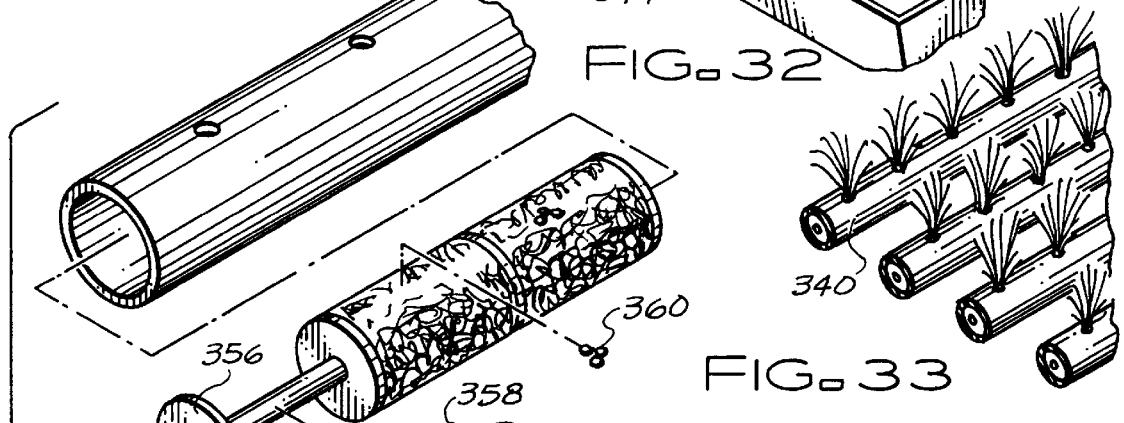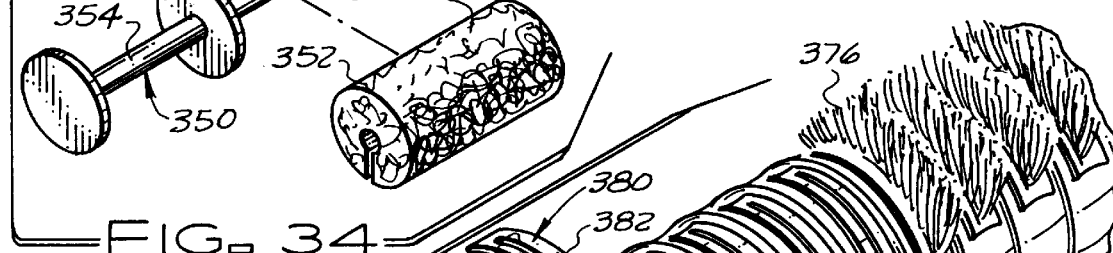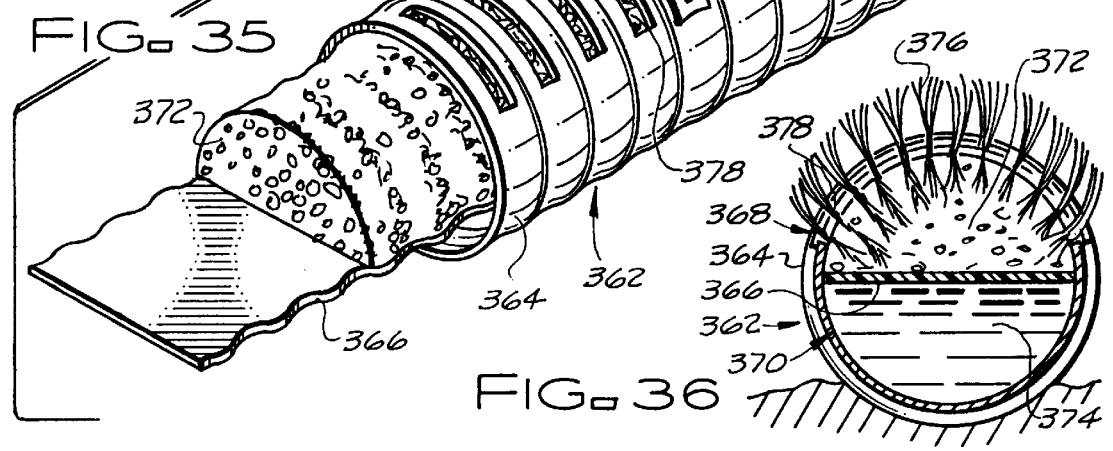

HYDROPONIC CULTIVATION APPARATUS AND METHOD

CROSS-REFERENCE TO RELATED APPLICATIONS

This application is a continuation of application Ser. No. 08/426,625, filed Apr. 20, 1995, now U.S. Pat. No. 5,588,256, which is a continuation-in-part of U.S. application Ser. No. 07/625,078, filed Dec. 10, 1990, now U.S. Pat. No. 5,224,291.

FIELD OF THE INVENTION

The present invention relates generally to horticultural devices and methods. More specifically, the present invention relates to hydroponic devices and methods which are particularly adapted for outdoor plant cultivation.

THE PRIOR ART

Hydroponics generally represents the growing of plants in nutrient solutions rather than in natural soil. For many horticultural applications, hydroponics provides significant benefits. For example, greater control may be exerted over the parameters which affect plant growth. Consequently, plant densities, plant growth rates, and product yields may exceed those achievable by cultivating plants in natural soil. Moreover, soil or other environmental conditions in various locations simply prohibit successful cultivation of certain plants. In these situations, such certain plants may be successfully cultivated using hydroponic techniques.

On the other hand, hydroponic techniques conventionally present significant drawbacks. The control of numerous parameters which affect plant performance usually requires a substantial investment in facilities and equipment. Often, hydroponic techniques are practiced indoors, in greenhouses and the like, where plant performance-affecting parameters may be more easily controlled than outdoors. The indoor facility needs, when coupled with elaborate equipment needs, often make such conventional hydroponic techniques prohibitively expensive. In addition, indoor space limitations often restrict the practice of conventional hydroponic techniques to a small scale. Furthermore, elaborate equipment often requires a great amount of human intervention and maintenance in order to achieve successful hydroponic results. Often times, a failure of a single piece of hydroponic equipment results in failure of an entire crop.

Still, in many potential applications some or all of the advantages of hydroponic techniques can be achieved without indoor facilities. Consequently, by practicing hydroponics outdoors many of the cost, space, and other disadvantages are minimized. While outdoor hydroponic systems are known, such conventional outdoor systems fail to adequately answer many of the problems posed by outdoor hydroponics.

For example, in arid climates hydroponics potentially offers great benefits because the successful cultivation of certain desirable plants in arid soil is exceedingly difficult. However, in arid climates evaporation of nutrient solutions becomes a serious problem. Evaporation may take place from a plant itself or directly from hydroponic equipment. Substantial evaporation from hydroponic equipment is especially undesirable because such evaporation may undesirably concentrate remaining nutrient solutions to the detriment of growing plants. Conventional hydroponic equipment fails to adequately retard the effects of evaporation, and consequently, increased maintenance is required to successfully cultivate plants.

In addition, conventional hydroponic equipment fails to adequately protect plant roots and nutrient solutions from insects and other contamination. While this problem is not as severe when equipment is used indoors, it becomes serious when used outdoors. Consequently, constant surveillance and maintenance is required outdoors to guard against infestations and contamination.

Furthermore, many conventional hydroponic devices are elaborate structures which are complicated to build and maintain and are thus undesirably expensive. Accordingly, such equipment is not suitable for outdoor use in applications where the equipment is replicated numerous times for the cultivation of large quantities of plants.

SUMMARY OF THE INVENTION

Accordingly, it is an advantage of the present invention that an improved hydroponic apparatus and plant cultivation technique is provided.

Another advantage of the present invention is that low maintenance hydroponic equipment is provided. Thus, overall expense of operating the present invention is reduced and large numbers of the present invention may be attended to with a minimum amount of human intervention.

Yet another advantage is that the present invention retards evaporation of nutrient solutions. Consequently, the present invention is suitable for use in arid climates without requiring excessive maintenance.

Still another advantage is that the present invention guards against insect infestations and contamination of plant roots and of nutrient solutions. Accordingly, the present invention improves survivability of cultivated plants and reduces required maintenance.

Another advantage is that the present invention is simple to construct and maintain. Thus, the present invention is inexpensive to acquire initially and to operate.

The above and other advantages of the present invention are carried out in one form by an apparatus which hydroponically cultivates a plant while retarding evaporation and protecting plant roots. The apparatus includes a container which is configured to retain a nutrient solution. The container has an opening therein. A seal is positioned within the opening. The seal has a hole which is dimensioned to provide physical contact between the seal and the plant's stem.

The above and other advantages of the present invention are carried out in another form by a method of efficiently cultivating a plant hydroponically. The method positions a seed on a porous support medium which resides within a growing container. The growing container has a seal, and the seal has a hole which is located generally above the seed. The method calls for dispersing a nutrient solution throughout the support medium located within the growing container. The method additionally guides the growth of the plant through the hole in the seal. The stem of the plant is surroundably contacted by the seal. Thus, this surrounding contact retards evaporation of the nutrient solution from the growing container. The seal expands to accommodate the stem as the plant grows.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

FIG. 3 shows a cross sectional view of the present invention at a planting stage of growth;

FIG. 4 shows a partial cross sectional view of the present invention after an initial growth stage;

FIG. 5 shows a partial cross sectional view of the present invention in connection with a mature plant;

FIG. 6 shows an exploded perspective view of another embodiment of a seal utilized in the present invention;

FIG. 7 shows a partial cross sectional view of the embodiment of FIG. 6 in connection with a mature plant;

FIG. 8 shows a cross sectional view of a further embodiment of a seal embodying the present invention;

FIG. 9 is a cross sectional view of another embodiment of a seal embodying the present invention;

FIG. 10 is a cross sectional view of yet another embodiment of a seal embodying the present invention;

FIG. 11 is a perspective view of the seal of FIG. 10 as it would appear prior to installing on an alternate plant grower;

FIG. 12 is a side view of the seal of FIG. 10 as it would appear prior to installation on containers of differing sizes and shapes;

FIG. 13 is a cross sectional view of yet a further embodiment of a seal embodying the present invention;

FIG. 14 is a perspective view of the seal of the present invention as it would appear being upstaged through a progression of enlarging medium;

FIG. 15 is a perspective view of an alternate embodiment of upstaging of plant media;

FIG. 16 is a perspective view of an auxiliary seal as it would appear prior to use;

FIG. 17 is a perspective view of the auxiliary seal of FIG. 16 as it would appear in sealing engagement with a plant;

FIG. 18 is a partial perspective view illustrating coupling means of the auxiliary seal of FIG. 16;

FIG. 19 is a cross sectional view of another embodiment of a seal embodying the present invention;

FIG. 20 is a cross sectional view of yet another embodiment of a seal embodying the present invention;

FIG. 21 illustrates a method of planting a large area employing a further embodiment of a plant grower;

FIG. 22 is a cross sectional view of the plant grower of FIG. 21;

FIG. 23 is a cross sectional view of maturing plant within the plant grower of FIG. 21;

FIG. 24 is a cross sectional view of the plant grower of FIG. 21 in connection with a mature plant;

FIG. 25 is a perspective view of another plant grower;

FIG. 26 is a partial cross sectional view of the grower of FIG. 25;

FIG. 27 is a perspective view of the grower of FIG. 25 as it would appear in a storage configuration;

FIG. 28 is a side view of the grower of FIG. 25 as it would appear prior to injection of a nutrient solution;

FIG. 29 is a perspective view of the grower being injected with a nutrient fluid;

FIG. 30 is a perspective view of the grower illustrating matured plants;

FIG. 31 is a partial perspective view of a plant grower utilizing a water collection assembly as it would appear in the stored position;

FIG. 32 is a partial perspective view of a plant grower utilizing a water collection assembly as it would appear in the collection position;

FIG. 33 is a partial perspective view of a plant grower utilizing a water collection assembly as it would appear with plant growth;

FIG. 34 is an exploded perspective view of a plant grower utilizing a spool for inserting and removing growing medium;

FIG. 35 is a perspective view of a plant grower utilizing linear seals;

FIG. 36 is a cross sectional end view of the grower of FIG. 35;

DETAILED DESCRIPTIONS OF THE PREFERRED EMBODIMENTS

Figures 1, 2:
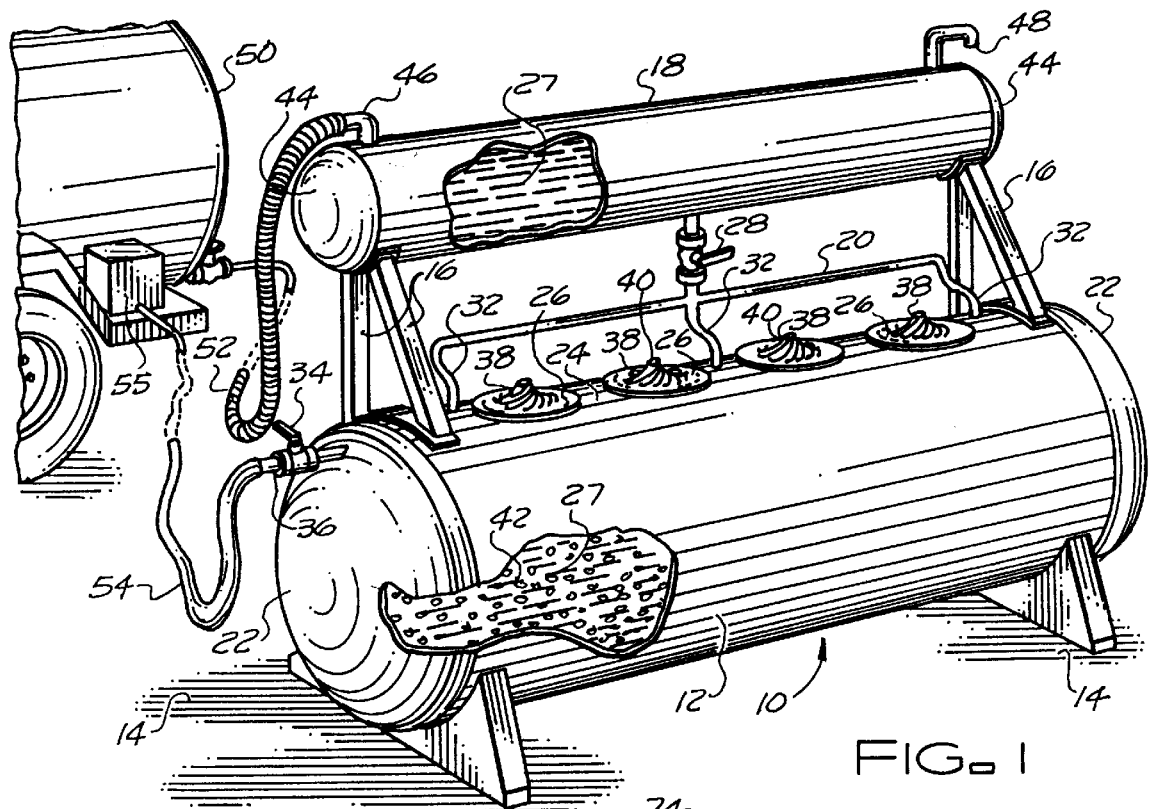
FIG. 1 shows a perspective view of a plant grower constructed in according with the present invention.
FIG. 2 shows an exploded perspective view of a preferred seal utilized in the present invention.

FIG. 1 shows a perspective view of a plant grower 10 constructed in accordance with the teaching of the present invention. Grower 10 includes a growing container 12, which may, but is not required to, reside directly on top of ground 14 in an outdoor environment. Supports 16 position a holding container 18 slightly above growing container 12. A manifold arrangement 20 couples holding container 18 to growing container 12.

Growing container 12 is constructed from a cylindrically shaped pipe, preferably formed from polyvinyl chloride (PVC) or another plastic. Container 12 includes end caps 22 to seal opposing ends of the pipe which forms container 12. An upper region 24 of container 12 includes a plurality of openings 26, which are axially spaced apart from one another in a line on container 12. The precise number of openings 26 is not an important parameter in the present invention. However, openings 26 are spaced apart from one another by at least a distance which corresponds to the maximum density at which the types of plants to be cultivated in grower 10 may be grown. Moreover, the size of openings 26 is sufficiently large to accommodate the stem diameters of mature ones of such plants.

In addition, manifold arrangement 20 couples to container 12 in a plurality of locations in upper region 24. Manifold arrangement 20 serves to selectively and uniformly supply a nutrient solution 27 from holding container 18 to growing container 12. Thus, an inlet of a valve 28 couples to holding container 18, and an outlet of valve 28 couples through a main distribution conduit 30 to each of a plurality of secondary distribution conduits 32. Each of secondary distribution conduits 32 couples to upper region 24 of growing container 12. In the preferred embodiment, manifold arrangement 20 is made from conventional PVC components and is hermetically sealed when valve 28 is in a closed state. When valve 28 is closed, no nutrient solution 27 may pass through manifold arrangement 20, but when valve 28 opens nutrient solution 27 may drain from holding container 18 through manifold arrangement 20 into growing container 12.

Growing container 12 additionally includes an evacuation valve 34, which FIG. 1 shows externally attached to the upper portion of one of an end cap 22. An evacuation tube 36 couples to the opposing side of valve 34 from container 12 and extends away from container 12 for a short distance. The external end of tube 36 is hermetically sealed from the interior of container 12 when valve 34 is shut. However, when valve 34 opens air may be pumped out from the interior of container 12 through valve 34 and tube 36.

Thus, except for openings 26, when valves 28 and 34 are shut the interior of growing container 12 is hermetically sealed from the outside environment. And, as discussed in more detail below, seals 38 are installed within openings 26 to secure openings 26. Generally speaking, a seal 38 hermetically clamps to the entire region of container 12 which surrounds an opening 26. Seal 38 includes a centrally located hole 40 through which a plant grows. As the plant grows, seal 38 surrounds and contacts the plant's stem to reduce evaporation of nutrient solution 27 from container 12 and to keep insects and contamination outside of container 12.

The interior of growing container 12 is substantially filled with an inert support medium 42, which supports seeds and growing plant roots. In the preferred embodiment, support medium 42 is a sponge or like material which exhibits substantial wicking ability so that nutrient solution 27 may be evenly distributed throughout medium 42 in upper region 24 of container 12 and not allowed to seep exclusively into the lower section of container 12. Preferably, support medium 42 is a natural sponge, but may be substantially any porous material, including but not limited to porous rubber, cellulose, or other product conventionally recoginized and used as a sponge Like growing container 12, holding container 18 is constructed from a cylindrically shaped pipe, preferably formed from polyvinyl chloride (PVC) or another plastic. Container 18 includes end caps 44 to seal opposing ends of the pipe which forms container 18. In addition, holding container 18 includes a filler tube 46 and an air escape tube 48 which attach to the upper sections of holding container 18. Moreover, the length and diameter of holding container 18 is selected in relationship to the size of growing container 12 so that when full, holding container 18 holds a predetermined quantity of nutrient solution 27. This predetermined quantity provides a single charge of nutrient solution 27 for growing container 12. This charge of nutrient solution 27 is the maximum quantity of solution 27 which growing container 12 may hold without causing harm to plants growing therein, and is determined empirically.

The apparatus and method of the present invention do not rely on any particular nutrient solution. Thus, any of the nutrient solutions known to those skilled in the art may suitably operate as nutrient solution 27.

In operation, a source 50 distributes nutrient solution 27 to holding tank 18. A tank carried on a truck or trailer may advantageously serve as source 50. Thus, multiple ones of growers 10 may be attended to by sequentially moving source 50 to the multiple growers 10. Preferably, valve 28 is initially shut. Source 50 may quickly fill holding container 18 through a hose 52 because holding container 18 contains no internal structure through which nutrient solution 27 must travel and holding container 18 includes air escape tube 48. Nutrient solution 27 may be driven through hose 52 using either a pump or the force exerted by gravity. In addition, the filling of holding container 18 measures a desired quantity of nutrient solution 27 for application to growing container 12. Simultaneously, a hose 54 is coupled between a pump 55 on source 50 and evacuation tube 36. When evacuation valve 34 is opened, air may be evacuated from the interior of growing container 12. As discussed below, seals 38 collapse around the stems of plants growing in growing container 12 to substantially prevent air leakage into container 12.

After holding container 18 has been filled with nutrient solution 27 and air has been sufficiently evacuated from within growing container 12, valve 28 is then opened. Consequently, nutrient solution 27 slowly drains into growing container 12 through manifold 20. Since manifold arrangement 20 couples to a plurality of points on growing container 12, nutrient solution 27 is distributed evenly within growing container 12. Moreover, since air has been evacuated from container 12, air pockets within container 12 and support medium 42 are minimized. Consequently, support medium 42 evenly absorbs and distributes nutrient solution 27. After the contents of holding container 18 have drained into growing container 12, valve 28 may be closed, then holding container 18 may optionally be filled again with nutrient solution 27 for future use.

FIG. 2 shows an exploded perspective view of a preferred seal 38 used in connection with grower 10. Specifically, seal 38 includes a top section 56 which mates with a bottom section 58. Top and bottom sections 56–58 include bases 60 and 62, respectively. Bases 60–62 are ring-shaped to conform to the section of growing container 12 which immediately surrounds opening 26. The bottom of top base 60 and the top of bottom base 62 support gaskets 64 which help to hermetically attach seal 38 to container 12. In addition, the bottom of top base 60 includes bottom-facing snap fastener socket members 66 while the top of bottom base 62 includes top-facing snap fastener plug members 68. As indicated in FIG. 2, top base 60 is placed outside of container 12 around opening 26 while bottom base 62 is placed inside container 12 around opening 26. Next, bases 60–62 are snapped together by inserting plug members 68 through separately bored holes or through opening 26 into socket members 66. The snapping together of bases 60–62 causes bases 60–62 to tightly clamp container 12 between gaskets 64. Consequently, a substantially hermetic attachment results between bases 60–62 and container 12.

In the preferred embodiment, each of top and bottom sections 56–58 of seal 38 includes a membrane 70, which extends from the interior of ring-shaped bases 60–62 radially inward to seal hole 40. Preferably, membrane 70 is formed from an impermeable, weather-resistant, resilient material, such as rubber, but it will be appreciated by one skilled in the art that substantially any material which is resilient, to engage a plant, and generally impervious to liquids and gases may be used. Thus, as a plant 72 matures and its stem 74 expands, hole 40 expands to accommodate stem 74. Each of top and bottom sections 56–58 includes a membrane 70 to provide double protection against seal failure.

Moreover, in the preferred embodiment, membrane 70 is configured to slope upward toward hole 40 from base 60 or 62 when installed on container 12. In order to achieve this three dimensional shape, excess material from membrane 70 is gathered up in pleats 76, which extend from base 60 or 62 toward hole 40. As pleats 76 approach hole 40, increased amounts of membrane 70 material are gathered in pleats 76. Thus, as plant stem 74 expands, hole 40 expands without tightly gripping plant stem 74. The upward slope of membrane 70 guides insects and other debris away from plant stem 74. However, when air is evacuated from growing container 12, as discussed above, lowered pressure within container 12 urges membrane 70 to tightly grip plant stem 74 temporarily to secure the seal against stem 74.

FIG. 3 shows the operation of the present invention at a planting stage in the life cycle of plant 72. Thus, plant 72 is merely a seed 78. As discussed above, container 12 contains nutrient solution 27, which has been absorbed upward by support medium 42. A hollow tube 80, such as a conventional drinking straw, has been inserted into growing container 12 through hole 40 in seal 38. Tube 80 has been inserted until one of its ends contacts support medium 42 within container 12. The other of its ends extends out from seal 38. Preferably, hole 40 is sufficiently small that it contacts tube 80. Tube 80 functions to keep seed 78 in place directly underneath hole 40 so that it cannot easily be dislodged from its resting place and so that its future growth will be guided out through hole 40. In addition, tube 80 preferably has transparent walls so that it channels light down to seed 78 to enhance germination of seed 78.

FIG. 4 shows the operation of the present invention after an initial growth stage in the life cycle of plant 72. Thus, plant seed 78 has sprouted and a small stem 74 has now grown through tube 80. In addition, small roots 82 have formed and are anchoring plant 72 in place on support medium 42.

At the stage of development illustrated in FIG. 4, the small diameter of tube 80 does not restrict growth of plant 72. However, as plant 72 continues to grow, its stem 74 expands. In the preferred embodiment, tube 80 is constructed from a material, such as paper or a biodegradable plastic, which easily breaks apart. Thus, by the time plant 72 reaches the growth stage where tube 80 would otherwise impede growth, tube 80 naturally breaks apart and such growth is not impeded.

FIG. 5 shows the operation of the present invention as plant 72 reaches a mature stage in its life cycle. As illustrated in FIG. 5, tube 80 has completely broken apart and no longer surrounds stem 74. Plant 72 has grown so that stem 74 is now much larger than the diameter of tube 80. In addition, as stem 74 has expanded, hole 40 in seal 38 has expanded to accommodate the growth in plant 72.

FIG. 6 shows an alternate embodiment of a seal generally designated 84 which may be used in plant grower 10. Seal 84 includes a top section 86 which mates with a bottom section 88. Top and bottom sections 86–88 include bases 90 and 92, respectively. Bases 90–92 are ring-shaped to conform to the section of growing container 12 which immediately surrounds opening 26. The bottom of top base 90 and the top of bottom base 92 support gaskets 94 which help to hermetically attach seal 84 to container 12. In addition, the bottom of top base 90 includes bottom-facing snap fastener socket members 96 while the top of bottom base 92 includes top-facing snap fastener plug members 98. As indicated in FIG. 6, top base 90 is placed outside of container 12 around opening 26 while bottom base 92 is placed inside container 12 around opening 26. Next, bases 90–92 are snapped together by inserting plug members 98 through separately bored holes or through opening 26 into socket members 96. The snapping together of bases 90–92 causes bases 90–92 to tightly clamp container 12 between gaskets 94.

Consequently, a substantially hermetic attachment results between bases 90–92 and container 12.

Top and bottom sections 86–88 of seal 84 include a membrane 100 and 102 respectively, extending from the interior of ring-shaped bases 90–92 inward to a seal hole 104. Tube 80 as described previously is shown inserted through hole 104. As with membranes 70, membranes 100–102 provide double protection against seal failure. However, in this embodiment while membrane 70 is configured to slope upward toward hole 40 from base 62 when installed on container 12, membrane 102 is configured to slope downward toward hole 104 from base 92. It will be appreciated by those skilled in the art that upward and downward are relative terms and are intended to refer to the direction of plant growth and root growth respectively. In some instances, such as when an opening is formed in the side of a growing container, the upward direction with respect to the seals is intended to be in a direction outward from the container, and downward is intended to be in a direction inward with respect to the container.

In order to achieve this three dimensional shape, excess material from membranes 100–102 is gathered up in pleats 106, which extend from base 90 and 92 respectively toward hole 104. As pleats 106 approach hole 104, increased amounts of membrane 100–102 material are gathered in pleats 106. Thus with reference to FIG. 7, as plant stem 108 expands, hole 104 expands without excessively gripping plant stem 108. The upward slope of membrane 100 guides insects and other debris away from plant stem 108 while the inward or downward slope of membrane 102 guides nutrient solution contained within container 12 away from hole 104 preventing leakage when inverted as shown in FIG. 7. When air is evacuated from growing container 12, as discussed above, lowered pressure within container 12 urges membrane 100 to tightly grip plant stem 108 temporarily securing the seal against stem 108. When the container is inverted, for whatever reason, nutrient solution pushes against membrane 102, urging it to tightly grip plant stem 108, temporarily securing the seal against stem 108 and preventing leakage of nutrient solution.

FIG. 8 show another embodiment of a seal generally designated 110. Seal 110 is generally identical to seal 84, including a top section 112 having a top base 114 and a bottom section 116 having a bottom base 118. However, in this specific embodiment, top base 114 and bottom base 118 are formed into an integral member with a groove 120 circumscribing seal 110 intermediate base 114 and base 118. Seal 110 is fabricated of a flexible material as described previously, which can be deformed for insertion of bottom section 116 through opening 26 of container 12. When properly inserted, the section of growing container 12 which immediately surrounds opening 26 is received within groove 120. The bottom of top base 114 and the top of bottom base 118 contact the section of growing container 12 which immediately surrounds opening 26, substantially hermetically attaching seal 110 to container 12.

FIG. 9 illustrates another embodiment of a seal generally designated 122. Seal 122 is generally identical to seal 110, including a top section 124 having a top base 126 and a bottom section 128 having a bottom base 130. Top base 126 and bottom base 130 are formed into an integral member with a groove 132 circumscribing seal 122 intermediate base 126 and base 130. As with seal 110, the section of growing container 12 which immediately surrounds opening 26 is received within groove 132 of seal 122. Seal 122 differs from seal 110 in that a self closing vent 134 is formed in seal 122, extending through top base 126 and bottom base 130 adjacent groove 132 and intended to replace or supplement valves 28 and 34 of plant grower 10. In this manner, a needle adaptor 136, for injecting a nutrient solution or evacuating air is inserted through seal 122, opening 26 and into container 12. A second vent 138 may also be formed in an identical manner to vent 134, for receiving a moisture meter 140 therethrough. It will be understood by those skilled in the art that a single vent may be used to evacuate air, insert a nutrient solution, and receive a moisture meter, or a separate vent may be formed for each.

Due to the nature of the material forming seal 122, preferably rubber, a slit through the material is sufficient to form vent 134, which is normally closed by the surfaces of the slit pressing against one another. Vent 134 may be opened by inserting an instrument therethrough, such as moisture meter 140, forcing the surfaces of vent 134 apart. The surfaces of vent 134 close around and seal the inserted instrument.

FIG. 10 illustrates another embodiment of a seal generally designated 142. Seal 142 is generally identical to seal 38, including a top section 144 having a top base 146, and a membrane 148 extending inward and sloping upward to an opening 150 as described previously in conjunction with FIG. 2, and a bottom section 152 having a bottom base 154. Seal 142 is also similar to seal 110 in that top base 146 and bottom base 154 are formed into an integral member with a groove 156 circumscribing seal 142 intermediate base 146 and base 154. However, bottom section 152 includes a membrane 158 which extends inward and slopes upward, within membrane 148, to an opening 160 as opposed to sloping downward.

FIG. 11 illustrates a plant grower generally designated by the reference character 162. Plant grower 162 includes seal 142 described previously and a growing container 164. In this embodiment, growing container 164 is any common container 166 having a cover 168, such as a tub used to contain butter, margarine, etc. which may be purchased at substantially any grocery store. Cover 168 is generally included when purchasing a product, and sealingly engages container 166. Container 166 and cover 168 can be easily converted for the intended use by forming an opening 170 in cover 168. Bottom section 152 of seal 142 is inserted through opening 170 of growing container 164. When properly inserted, the portion of cover 168 which immediately surrounds opening 170 is received within groove 157. The bottom of top base 146 and the top of bottom base 154 contact the section of cover 168 which immediately surrounds opening 170, substantially hermetically attaching seal 142 to growing container 164.

Recycling commonly used container 166 in this manner provides a small inexpensive lightweight plant grower. While not specifically shown, growing container 164 may include a support media as previously described, for supporting roots and containing nutrient solution. Those skilled in the art will also appreciate that while growing container 164 as shown would require removal of cover 168 for insertion of nutrient solution, vent 134 as described in FIG. 9 may be formed in seal 142. This would allow evacuation of air from within container 164, and injection of a nutrient solution in a manner similar to that described previously.

FIG. 12 is intended to illustrate that containers 172 of many different sizes and shapes may be converted to plant growers by forming openings in their respective covers 174 and inserting a seal 142.

FIG. 13 illustrates another embodiment of a seal generally designated 178 which may replace seals in plant grower 10. Seal 178 is generally identical to seal 110, including a top section 180 having a top base 182, and a membrane 184 extending inward and sloping upward to an opening 186, and a bottom section 188 having a bottom base 190. Seal 178 is also similar to seal 110 in that top base 182 and bottom base 190 are formed into an integral member with a groove 192 circumscribing seal 178 intermediate base 182 and base 190. However, bottom section 188 includes a membrane 194 which extends inward and slopes upward, substantially parallel to membrane 184 before flaring downward to an opening 196. The upward slope of membrane 194 raises opening 196 to a level generally even with bottom base 190. In this configuration, bottom section 188 of seal 178 is flush with support medium 42. While the downward flaring of membrane 194 is sufficient so that when the container is inverted or tilted, nutrient solution pushes against membrane 194, urging it to tightly grip the plant stem, temporarily securing the seal against the stem and preventing leakage of nutrient solution, membrane 194 does not extend into container 12 far enough to hinder removal of support medium 42 from container 12. Since bottom section 188 of seal 178 is substantially flush with support medium 42, support medium 42 may be removed without damage and without requiring the prior removal of seal 178.

FIG. 14 illustrates an upgrade system for increasing the size of the support medium as a plant grows. In this manner, a plant 198 in a small plant grower 200 can be transplanted. Plant grower 200 initially includes a seal which may be seal 142 or seal 178, but for purposes of brevity will be referred to as seal 178 in this embodiment, a growing container 202, and a support medium 204 carried by growing container 202. As plant 198 increases in size and its root system expands to the limits of growing container 202, plant 198 with seal 178 is removed from container 202, and inserted into an expander 206. Expander 206 is a cylindrical section constructed of material substantially identical to support medium 204, having a cavity 208 formed therein for receiving support medium 204. The consequence is to effectively increase the size of the support medium without disturbing the root system of the plant. Expander 206 may, in turn, be inserted into a larger expander 210 having a cavity 212. Upgrading the size of the support medium may also require a larger growing container.

FIG. 15 shows an upgrade system substantially identical to that illustrated in FIG. 14, with the difference being that a plurality of plants 214 are grown in a plurality of generally cuboidal support media 216, serially attached. As the root system of each plant 214 reaches the limit of its respective support medium 216, support medium 216 are separated and each inserted into one of a plurality of generally cuboidal expanders 218. Expanders 218 each have a cavity 220 for receiving support media 216, and, in this embodiment, are serially attached as were support media 216. Expanders 218 may be separated as the root system of each plant 214 reaches the new limit, and each expander 218 inserted into a cavity 222 a larger expander 224.

FIGS. 16 and 17 show an auxiliary seal 226 to be used in combination with seal 38, and seal 142 or any subsequent seals having a bottom section with an upward sloping membrane. Auxiliary seal 226 is a round generally planar member, having an edge 228 and a centrally located opening 230. Auxiliary seal 226 has a plurality of striations 232 extending from edge 228 to opening 230, dividing it into pie shaped wedges 234. Auxiliary seal 226 is attached to the underside of the bottom section of the seal, within the container. As a plant 236 grows, illustrated by broken lines, its stem 238 forces wedges 234 to separate along striations 232 beginning adjacent opening 230 and gradually expanding as stem 238 thickens. As wedges 234 separate, each wedge 234 is compressed by stem 238, enlarging opening 230. Preferably, wedges 324 are compressed radially outward, however, as shown in FIG. 17 a slight upward slope towards opening 230 may occur. The gradual separation of wedges 234 insures a snug fit between auxiliary seal 226 and stem 238, preventing leakage of nutrient solution.

FIG. 18 shows attachment means for attaching auxiliary seal 226 to the bottom section of the seal. Attachment means preferably consists of an adhesive 240 applied to the periphery of a top surface 242 of auxiliary seal 226, protected by a peel strip 244. When attachment of auxiliary seal 226 is desired, peel strip 244 is removed and auxiliary seal 226 is pressed into place.

FIG. 19 illustrates another embodiment of a seal generally designated 246. Seal 246 is configured to engage and close a container 248 having a rim 250. Seal 246 includes a cylindrical collar 252 having an upper edge 254 and a lower edge 256 and a membrane 258 extending radially inward to a seal hole 260. Membrane 258 slopes upward toward hole 260 from collar 252 when installed on container 248. As with previously described membranes, in order to achieve this three dimensional shape, excess material from membrane 258 is gathered up in pleats (not visible) extending from collar 252 toward hole 260. As the pleats approach hole 260, increased amounts of membrane 252 material are gathered in the pleats. Thus, as a plant stem expands, hole 260 expands without tightly gripping the plant stem and causing damage or hindering growth. The upward slope of membrane 258 guides insects and other debris away from the plant stem. Collar 252 is formed from an impermeable, weather-resistant, elastic material, such as rubber, and is expandable to encompass and constrictively engage rim 250 of container 248. The elastic nature of collar 252 allows it to expand and engage a range of container sizes as well as to effectively seal container 248.

FIG. 20 is yet a further embodiment of a seal generally designated 262. Seal 262 is generally identical to seal 142, including a top section 264 having a top base 266, and a membrane 268 extending inward and sloping upward to an opening 270, and a bottom section 272 having a bottom base 274 and a membrane 276 extending inward and sloping upward to an opening 278. Top base 266 and bottom base 274 are formed into an integral member with a groove 280 circumscribing seal 262 intermediate base 266 and base 274. However, in this specific embodiment, membranes 268 and 276 are each separated into a plurality wafer like layers 282, separated at opening 278, establishing a greater sealing potential about a plant stem since wafers layers 282 effectively form multiple seals.

FIGS. 21–24 show a method of planting a large area using a further embodiment of a plant grower generally designated 284. Referring specifically to FIG. 21, plant grower 284 is ejected from a transport apparatus such as an airplane 286. Plant grower 284 comes to rest upon a surface 288 upon which plant growth is desired. Plant grower 284 will protect roots 290 of plant 292 from the environment while immature, providing nutrient solution and support for its stem 294 until sufficiently grown to survive on its own, or until extra support can be implemented. It can be seen with reference to FIG. 22, that plant grower 284 includes a substantially spherical container 296 carrying a support medium 298 and a nutrient solution 300. Container 196 has a contact portion 302 designed to rest upon surface 288, side portion 304 and a seal 306 generally opposing contact portion 302. Side portion 304 and seal 306 are preferably formed from identical material which is elastic and semipermeable, having osmotic properties. In other words, water from outside may enter container 296 through side portion 304 and seal 306, but moisture will not move outward from container 296. It will be understood that side portion 304 may be fabricated of osmotic material while seal 306 is formed from material identical to previously described seals, with seal 306 bonded to side portion 304. Contact portion 302 is required to be formed from a degradable material for purposes which will be described subsequently. Seal 306 may be substantially identical to any of the preceding embodiments, but is preferably similar to seal 246 without collar 252. Seal 306 includes a membrane 308 integral with side portion 304 and sloping upward to a central opening 310. Seal 306 will prevent loss of nutrient solution 300 and will support and protect immature plant 292. As plant 292 matures opening 310 expands with the expansion of the maturing stem 294 as described in previous embodiments and shown in FIG. 23. As time passes and roots 290 continue to fill container 296, contact portion 302 degrades and is broken apart by roots 290. At this point plant 292 begins to take root in surface 288 as shown in FIG. 24.

FIG. 25 shows yet a further embodiment of a plant grower generally designated 312, to be used to grow food plants for grazing animals or ground cover such as grass for a lawn. Plant grower 312 includes a flexible container 314 preferably being an elongated rectangular box having a seal layer 316 through which a closable valve 318 extends. Container 314 is preferably fabricated from nontoxic degradable material. With additional reference to FIG. 26, container 314 includes a base 320 with sidewalls 322 containing a support medium 324 preferable a porous material having wicking properties. Seal layer 316 is coupled to sidewalls 322 enclosing support medium 324. Parallel layers 326 of a penetrable material such as cheese cloth or perforated paper overlie support medium 324 beneath seal layer 316 for supporting seeds 328 therebetween. Seal layer 316 in this embodiment is fabricated of a degradable material which may also be consumed by grazing animals. A preferred material for seal layer 316 is gelatin which may be harden by polishing with vegetable oil or carnuba wax. The point being, that when plant grower 312 is used to grow pasturage for grazing animals, it would contain nothing harmful to those animals. When used to grow sod or other ground cover, plant grower 312 would be biodegradable, allowing the plants to take root in the undersurface. The use of plant grower 312 for growing sod would reduce the amount a water needed, and protect seeds 328 from seed eating animals such as birds and insects.

With reference to FIGS. 27 and 28, plant grower 312 would be evacuated, to reduce air within container 314 and support medium 324. With reduced interior air pressure, sidewalls 322 of container 314 would collapse in an accordion fashion illustrated in FIG. 28. Plant grower 312 may then be rolled into a compact bundle 330 easily transportable.

Referring now to FIGS. 29 and 30, when a surface 332 to be planted is located or pasturage is required, bundle 330 is unrolled and a hose 334 for providing a nutrient solution is coupled to valve 318. Nutrient solution is distributed equally throughout support medium 324 due to its wicking characteristics, reinflating container 314. At this time seeds 328 will begin to germinate, producing immature plants 336 which force their way through seal layer 316. When the plants mature, grazing animals can be given access, or eventually container 314 will degrade allowing the plants to root in surface 332.

FIGS. 31 and 32 show a water collection system for use with a plurality of parallel plant growers 340 substantially similar to plant grower 10. Each of plant growers 340 are suspended with an end 342 positioned over a collection reservoir 344. A curtain 346 of water proof material is suspended between plant growers 340 and slidably extendable along tracks 348 attached to the outer surface of plant growers 340. FIG. 31 illustrates curtains 346 when bunched near end 342. This permits tenders to walk between plant growers 340 and tend to the plants. FIG. 32 illustrates curtains 346 when extended along tracks 348 between plant growers 340. In this position precipitation can be collected and channeled to reservoir 344 for future use.

FIG. 33 illustrates the plurality of plant growers 340 with plants growing therefrom.

FIG. 34 shows a spindle 350 for removing and inserting support medium 352 within a plant grower. Growing container 12 of plant grower 10 is illustrated, with seals 38 removed from openings 26 and end cap 22 removed. Spindle 350 includes an axially extending rod 354 carrying spaced apart laths 356 constructed of water permeable material such as wire mesh. Laths 356 are preferably round to slide easily within growing container 12 and spaced to form a separation between each opening 26. a cylindrical section 358 of support medium 352 is positioned on rod 354 between each of laths 356 to provide support for plants and contain nutrient solution. After the plants have been harvested, support medium 352 must be removed and new or cleaned support medium inserted. This is easily accomplished by removing spindle 350 and replacing sections 358. By using spindle 350, compression and unequal distribution of support medium 352 is avoided. Furthermore, seeds 360 may be placed upon each section 358 prior to inserting new support medium in preparation for growing a new crop.

FIGS. 35–36 show an alternate embodiment of a plant grower generally designated 362. Plant grower 362 includes a cylindrical container 364, preferably of the corrugated metal piping commonly used as culverts. A divider 366 is positioned within container 364, separating it into a top portion 368 and a bottom portion 370. A support medium 372 is carried within top portion 368 to support and supply nutrient solution 374 or water to plants 376. Bottom portion 370 is used as a reservoir for storing nutrient solution 374 to be used in top portion 368. A plurality of openings 378 are formed in top portion 368 of container 364 preferably between corrugations, but it will be understood that they may be alternatively formed on each corrugation. When plants 376 need additional nutrient solution 374, a tender will use a conventional fluid transfer device for transferring nutrient solution from bottom portion 370 to top portion 358.

Plant grower 362 also includes linear seals 380 having a generally rectangular base 382 from which a membrane 384 extends inwardly to a slot 386. Base 382 is coupled to the portion of container 364 surrounding openings 378. Preferably, membrane 384 is formed from an impermeable, weather-resistant, resilient material, such as rubber. Thus, as a plant 376 matures and expands, slot 386 expands to accommodate it.

Figure 37:
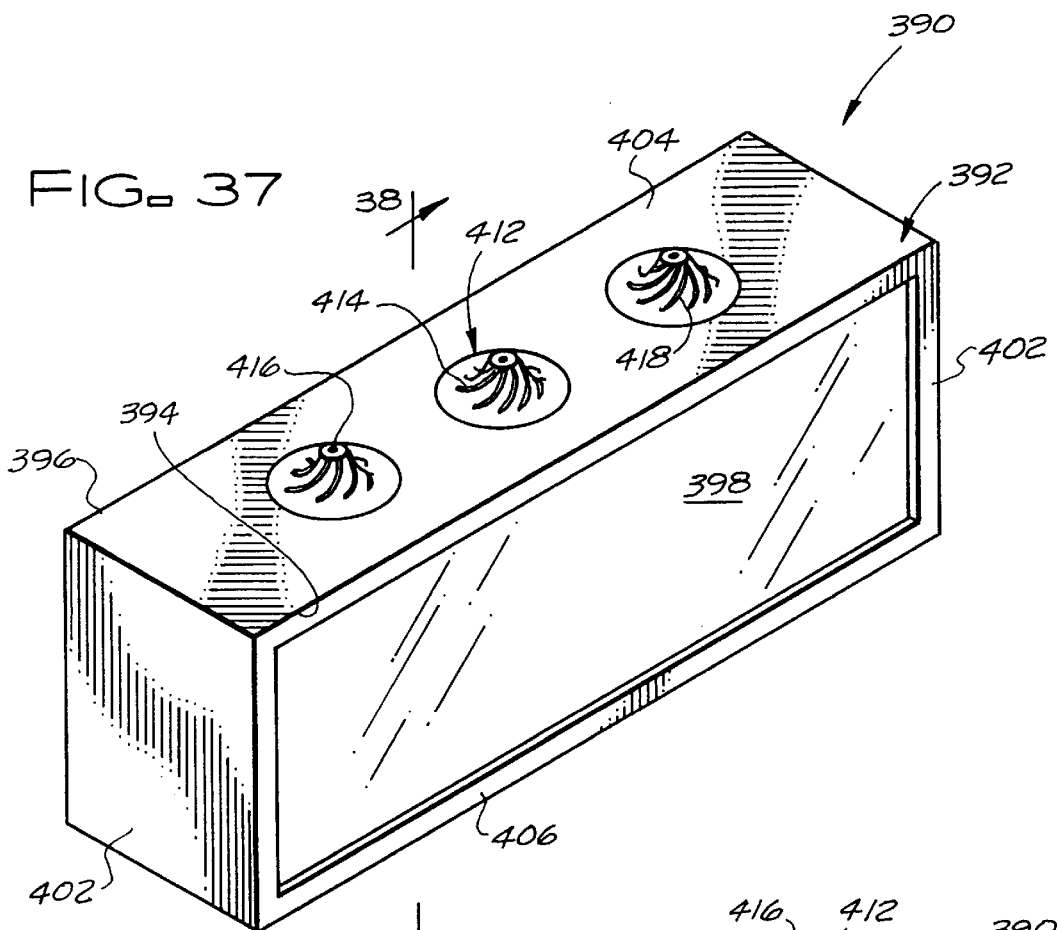
FIG. 37 is an exploded perspective view of yet a further embodiment of the present invention.
Figure 38:
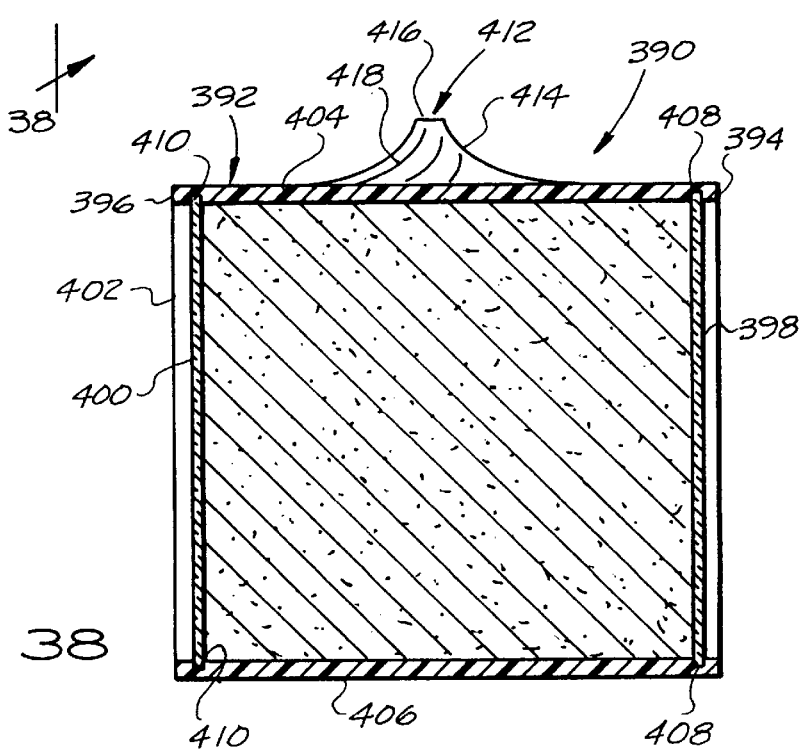
FIG. 38 is a cross sectional view taken along line 38—38 of FIG. 37.

FIGS. 37–38 show another embodiment of a plant grower generally designated 390, functioning mainly as an educational tool, allowing the growth of a plant to be viewed. Plant grower 390 includes an elastic frame 392 having a front edge 394 and a back edge 396, a front transparent panel 398 carried by frame 392 proximate front edge 394, and a back transparent panel 400 carried by frame 392 opposite front panel 398 proximate back edge 396. Frame 392 includes a pair of opposing sides 402, coupled by a top 404 and a substantially parallel bottom 406. Preferably, frame 392 is formed from rubber, and fabricated in a single integral piece. A pair of channels 408 and 410 are formed around the periphery of the inner surface of frame 392, proximate front edge 394 and back edge 396 respectively. Channels 408–410 receive panels 398 and 400 respectively forming a fluid tight seal therewith. Insertion and removal of panels 398 and 400 is possible due to the elastic property of frame 392 which can be expanded away from panels 398 and 400 for removal and insertion, and which will compressively engage panels 398 and 400 forming a fluid tight seal. 412 each include a membrane 414 extending radially inward to an opening 416. Preferably, membrane 414 is formed from and integral with the elastic material of frame 392. Thus, as a plant matures and its stem expands, opening 416 expands to accommodate the stem. Moreover, in the preferred embodiment, membrane 414 is configured to slope upward toward opening 416 from frame 392. In order to achieve this three dimensional shape, excess material from membrane 414 is gathered up in pleats 418, which extend from frame 392 toward opening 416. As pleats 418 approach opening 416, increased amounts of membrane 414 material are gathered in pleats 418. Thus, as the plant stem expands, opening 416 expands without tightly gripping the plant stem and hindering growth. While three seals 412 are illustrated, it will be understood that the number of seals 412 is not important to the invention, and substantially any number of seals 412 from one or more may be used. Furthermore, it will be understood that seals 412 may be separate from frame 392 and attached and removed at will.

In summary, the present invention provides an improved hydroponic apparatus and plant growing technique. The apparatus of the present invention is constructed from inexpensive components. Moreover, plants growing outdoors within the apparatus of the present invention need less maintenance because seals are provided to reduce evaporation, insect infestation, and other contamination. In addition, a structure is provided so that nutrient solution may be delivered quickly. As a result, a large number of plants may be at tended to in a short period of time and at low cost.

The present invention has been described above wit h reference to a number of embodiments. However, those skilled in the art will recognize that changes and modifications may be made in these embodiments without departing from the scope of the present invention. For example, the present invention may be buried underground for aesthetic or other reasons. Various embodiments of the seals may also be interchanged with the different embodiments of plant growers. It will also be appreciated by one skilled in the art that the various described auxiliary devices, such as vents of FIG. 9, used to evacuate air and insert nutrient solution may be used with any of the plant growers and seals. In addition, additional provisions may be provided for draining nutrient solutions from the containers of the present invention. These and other changes and modifications which are obvious to those skilled in the art are intended to be included within the scope of the present invention.

What is claimed is:

1. An apparatus for hydroponically nurturing a seed into a plant having roots and for protecting said seed and retarding evaporation, said apparatus comprising:

a container adapted to retain a nutrient solution, said container having an opening therein;

a seal layer carried by and coupled to the container and extending across said opening, sealing said container, said seal layer pierceable by said growing plant;

a porous support medium into which said plant roots grow, located within said container;

a valve coupled to said seal layer for evacuating air within said container, and injecting said nutrient solution; and a pair of substantially parallel penetrable layers capturing said seed therebetween and positioned between said seal layer and said support medium for positioning said seed.

2. An apparatus as claimed in claim 1 wherein said container is preferably constructed of a material which will break apart as said plant grows, allowing said roots to extend into a surface.

3. An apparatus as claimed in claim 1 wherein said seal layer is fabricated of stiffened gelatin.

* * * * *